US010229156B2

(12) United States Patent
Bishop et al.

(10) Patent No.: US 10,229,156 B2
(45) Date of Patent: Mar. 12, 2019

(54) USING PRIORITY SCORES FOR ITERATIVE PRECISION REDUCTION IN STRUCTURED LOOKUPS FOR QUESTIONS

(71) Applicant: International Business Machines Corporation, Armonk, NY (US)

(72) Inventors: Timothy A. Bishop, Minneapolis, MN (US); Stephen A. Boxwell, Columbus, OH (US); Benjamin L. Brumfield, Cedar Park, TX (US); Nirav P. Desai, Austin, TX (US); Stanley J. Vernier, Columbus, OH (US)

(73) Assignee: International Business Machines Corporation, Armonk, NY (US)

( * ) Notice: Subject to any disclaimer, the term of this patent is extended or adjusted under 35 U.S.C. 154(b) by 327 days.

(21) Appl. No.: 14/531,214

(22) Filed: Nov. 3, 2014

(65) Prior Publication Data

US 2016/0124961 A1     May 5, 2016

(51) Int. Cl.
*G06F 17/30*      (2006.01)
(52) U.S. Cl.
CPC .... *G06F 17/3043* (2013.01); *G06F 17/30654* (2013.01)
(58) Field of Classification Search
CPC .................................................... G06F 17/30
See application file for complete search history.

(56) References Cited

U.S. PATENT DOCUMENTS

| 5,933,822 | A | 8/1999 | Braden-Harder et al. |
| 8,055,603 | B2 | 11/2011 | Angell et al. |
| 8,145,582 | B2 | 3/2012 | Angell et al. |
| 8,756,245 | B2* | 6/2014 | Imielinski ......... G06F 17/30401 704/9 |
| 2003/0069880 | A1* | 4/2003 | Harrison ........... G06F 17/30663 707/999.003 |
| 2006/0173834 | A1 | 8/2006 | Brill et al. |
| 2007/0094256 | A1 | 4/2007 | Hite et al. |
| 2010/0082331 | A1 | 4/2010 | Brun et al. |
| 2010/0287162 | A1 | 11/2010 | Shirwadkar |
| 2013/0226846 | A1* | 8/2013 | Li ............................ G06N 5/02 706/12 |
| 2013/0253892 | A1 | 9/2013 | Friedlander et al. |
| 2013/0268521 | A1* | 10/2013 | Haykal ............. G06F 17/30604 707/723 |

(Continued)

OTHER PUBLICATIONS

Bishop et al., "Using Synthetic Events to Identify Complex Relation Lookups," U.S. Appl. No. 14/859,334, filed Sep. 20, 2015, 36 pages.

(Continued)

*Primary Examiner* — Khanh B Pham
(74) *Attorney, Agent, or Firm* — VanLeeuwen & VanLeeuwen; William J. Stock (57) ABSTRACT

An approach is provided in which a knowledge manager matches a question to multiple natural language contexts that each correspond to relations associated with entities in a structured resource. The knowledge manager identifies database queries corresponding to the multiple natural language contexts and assigns priority scores to the database queries based upon their relative specificity. In turn, the knowledge manager invokes one of the database queries based upon the assigned priority scores.

9 Claims, 10 Drawing Sheets

(56) References Cited

U.S. PATENT DOCUMENTS

2014/0032574 A1* 1/2014 Khan ................ G06F 17/30424
  707/754
2014/0108321 A1   4/2014 Buchanan et al.
2014/0279837 A1   9/2014 Guo et al.
2015/0186528 A1* 7/2015 Rao ................... G06F 17/30867
  707/710

OTHER PUBLICATIONS

"List of IBM Patents or Patent Applications Treated as Related," Letter from Leslie A. Van Leeuwen, Sep. 20, 2015, 1 page.
Bishop et al., "Using Synthetic Events to Identify Complex Relation Lookups," U.S. Appl. No. 14/531,183, filed Nov. 3, 2014, 41 pages.

* cited by examiner

USING PRIORITY SCORES FOR ITERATIVE PRECISION REDUCTION IN STRUCTURED LOOKUPS FOR QUESTIONS

BACKGROUND

A question answer system answers questions posed in a natural language format by applying advanced natural language processing, information retrieval, knowledge representation, automated reasoning, and machine learning technologies. Question answer systems differ from typical document search technologies because document search technologies return a list of documents ranked in order of relevance to a word query, whereas a question answer system receives a question expressed in a natural language, analyzes the question in a natural language context, and returns a precise answer to the question.

System developers may train question answer systems to specific domains to provide more relevant answers to domain-specific questions (e.g., financial domain, travel domain, etc.). One approach to training a question answer system is to ingest corpora from trusted, traditional sources (textbooks, journals) that include accurate information. The question answer system may ingest structured resources, such as relational databases or spreadsheets, which are designed to facilitate finding relationships between specific entities. However, a question answer system may have difficulty linking data together to answer a question when the data is organized differently than a specific query expects.

BRIEF SUMMARY

According to one embodiment of the present disclosure, an approach is provided in which a knowledge manager matches a question to multiple natural language contexts that each correspond to relations associated with entities in a structured resource. The knowledge manager identifies database queries corresponding to the multiple natural language contexts and assigns priority scores to the database queries based upon their relative specificity. In turn, the knowledge manager invokes one of the database queries based upon the assigned priority scores.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

Figure 1:
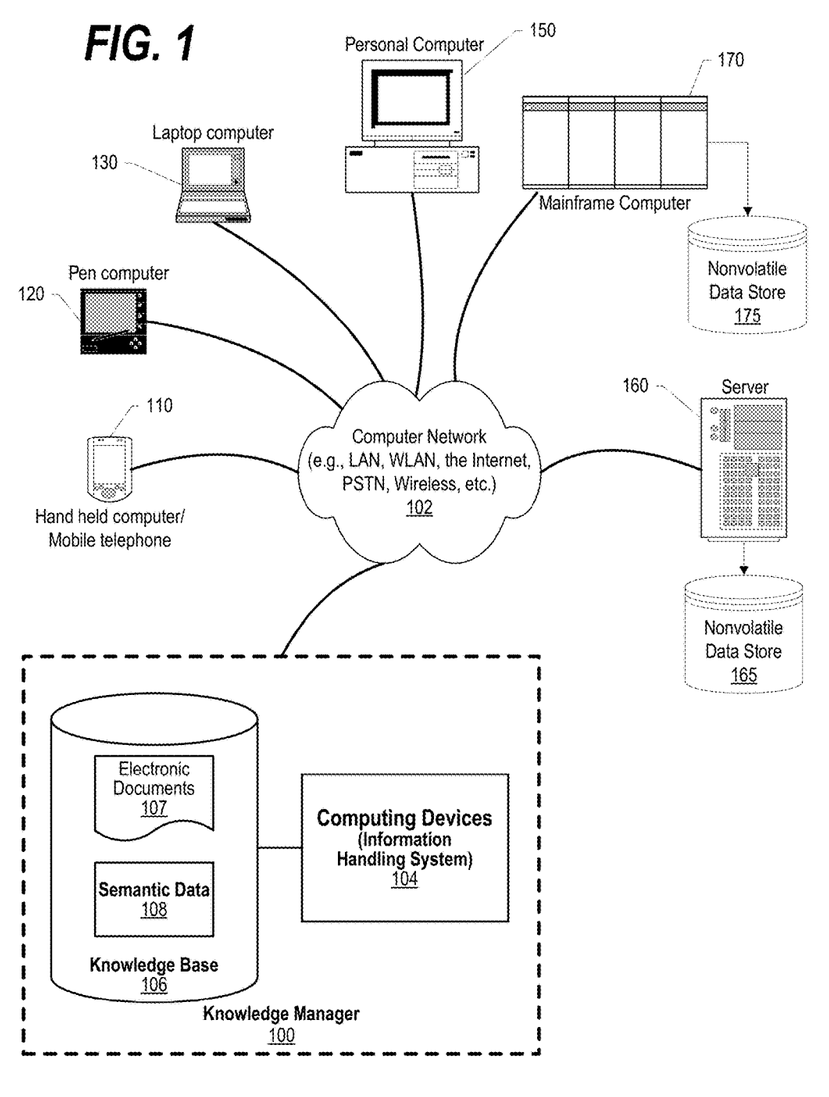
FIG. 1 depicts a schematic diagram of one illustrative embodiment of a knowledge manager system in a computer network.

FIG. 1 depicts a schematic diagram of one illustrative embodiment of a question/answer creation (QA) system 100 in a computer network 102. Knowledge manager 100 may include a computing device 104 (comprising one or more processors and one or more memories, and potentially any other computing device elements generally known in the art including buses, storage devices, communication interfaces, and the like) connected to the computer network 102. The network 102 may include multiple computing devices 104 in communication with each other and with other devices or components via one or more wired and/or wireless data communication links, where each communication link may comprise one or more of wires, routers, switches, transmitters, receivers, or the like. Knowledge manager 100 and network 102 may enable question/answer (QA) generation functionality for one or more content users. Other embodiments of knowledge manager 100 may be used with components, systems, sub-systems, and/or devices other than those that are depicted herein.

Knowledge manager 100 may be configured to receive inputs from various sources. For example, knowledge manager 100 may receive input from the network 102, a corpus of electronic documents 106 or other data, a content creator 108, content users, and other possible sources of input. In one embodiment, some or all of the inputs to knowledge manager 100 may be routed through the network 102. The various computing devices 104 on the network 102 may include access points for content creators and content users. Some of the computing devices 104 may include devices for a database storing the corpus of data. The network 102 may include local network connections and remote connections in various embodiments, such that knowledge manager 100 may operate in environments of any size, including local and global, e.g., the Internet. Additionally, knowledge manager 100 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, the content creator creates content in a document 106 for use as part of a corpus of data with knowledge manager 100. The document 106 may include any file, text, article, or source of data for use in knowledge manager 100. Content users may access knowledge manager 100 via a network connection or an Internet connection to the network 102, and may input questions to knowledge manager 100 that may be answered by the content in the corpus of data. As further described below, when a process evaluates a given section of a document for semantic content, the process can use a variety of conventions to query it from the knowledge manager. One convention is to send a well-formed question. Semantic content is content based on the relation between signifiers, such as words, phrases, signs, and symbols, and what they stand for, their denotation, or connotation. In other words, semantic content is content that interprets an expression, such as by using Natural Language (NL) Processing. In one embodiment, the process sends well-formed questions (e.g., natural language questions, etc.) to the knowledge manager. Knowledge manager 100 may interpret the question and provide a response to the content user containing one or more answers to the question. In some embodiments, knowledge manager 100 may provide a response to users in a ranked list of answers.

In some illustrative embodiments, knowledge manager 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Types of information handling systems that can utilize knowledge manager 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 100. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
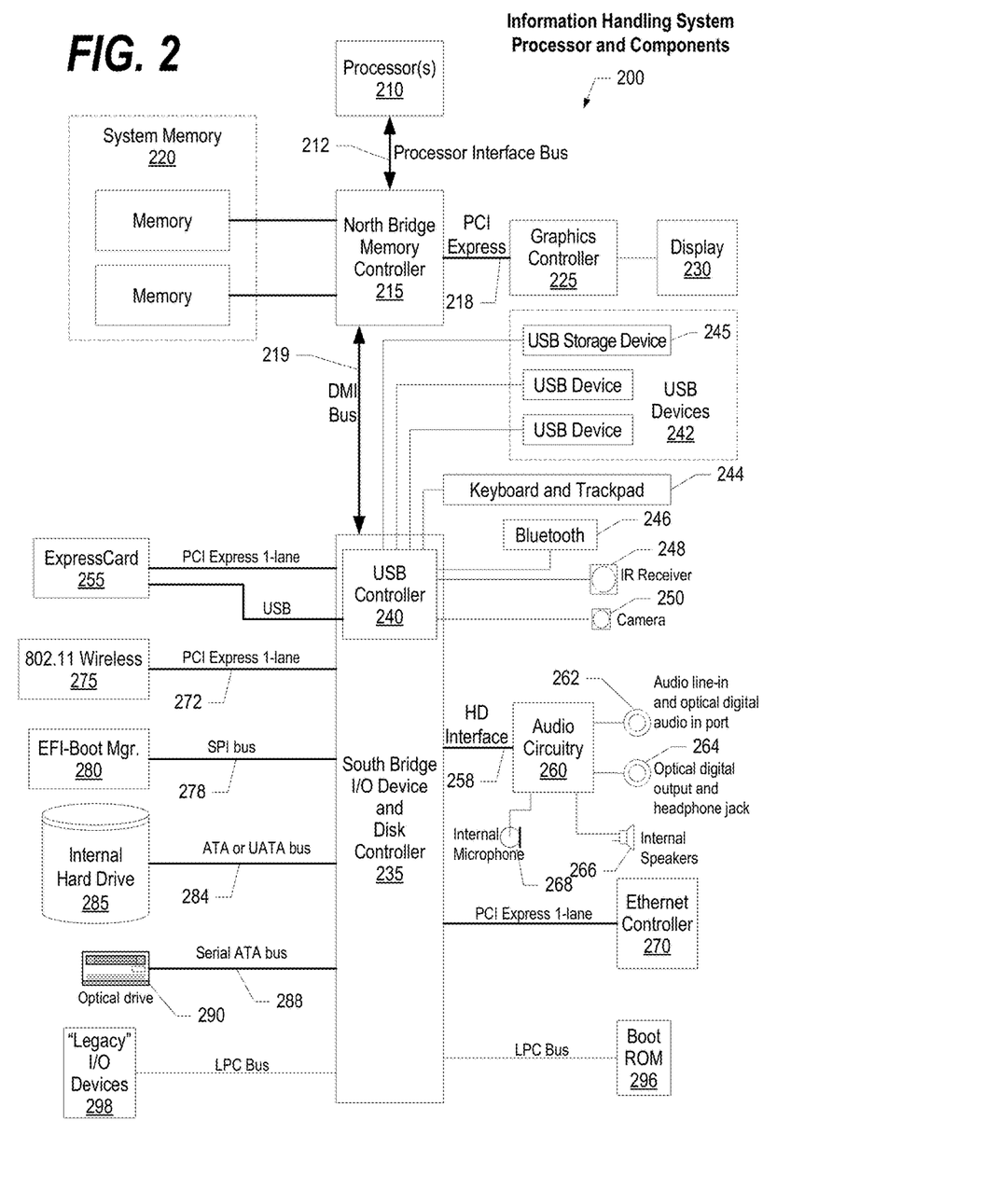
FIG. 2 illustrates an information handling system, more particularly, a processor and common components, which is a simplified example of a computer system capable of performing the computing operations described herein.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. The LPC bus also connects Southbridge 235 to Trusted Platform Module (TPM) 295. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etcetera.

Wireless Local Area Network (LAN) device 275 connects to Southbridge 235 via the PCI or PCI Express bus 272. LAN device 275 typically implements one of the IEEE .802.11 standards of over-the-air modulation techniques that all use the same protocol to wireless communicate between information handling system 200 and another computer system or device. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

FIGS. 3-10 depict an approach that can be executed on an information handling system. The information handling system generates a synthetic event and corresponding synthetic event relations that serve as implicit relational links to entities in a structured resource, database, or spreadsheet. The information handling system then analyzes a corpus of documents in light of the synthetic event relations to generate natural language contexts. As such, the information handling system creates pattern maps that map the natural language contexts to corresponding database queries. When the information handling system correlates a question to one of the natural language contexts, the information handling system invokes the corresponding query to retrieve results from a database.

Figure 3:
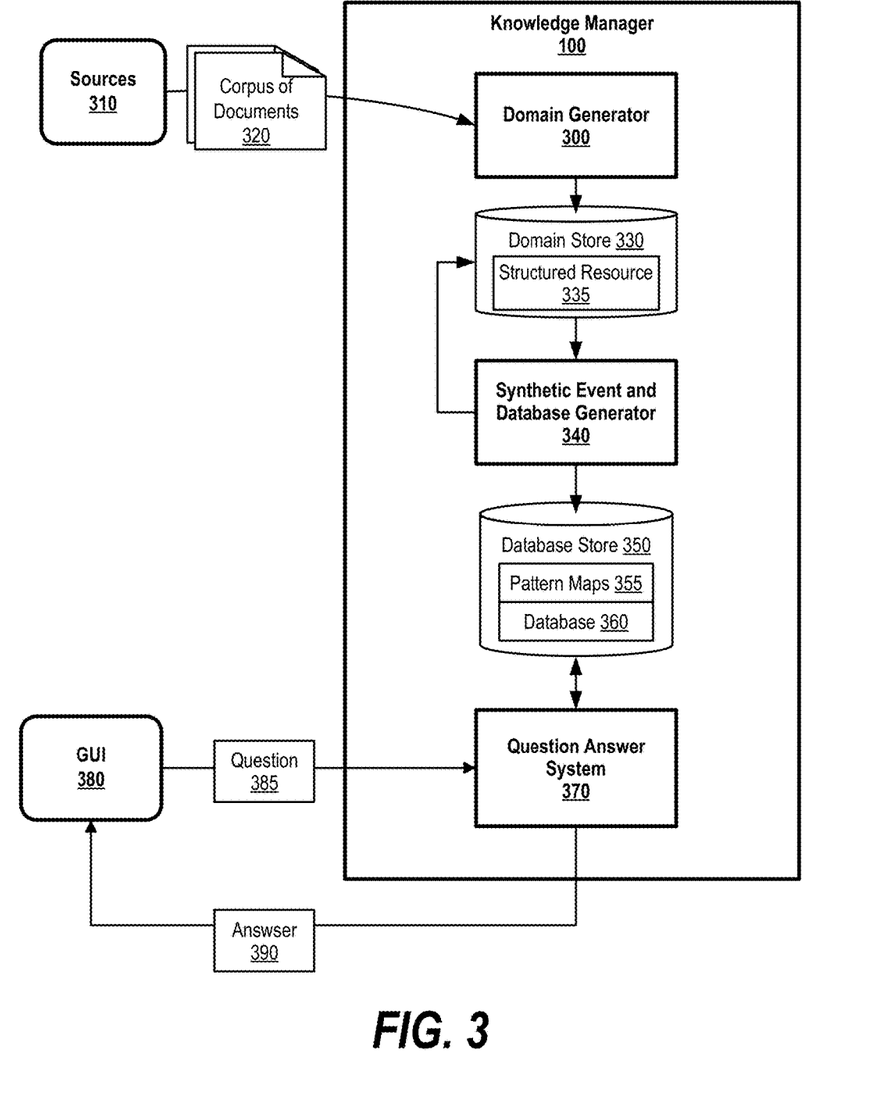
FIG. 3 is an exemplary diagram depicting a knowledge manager that links natural language contexts to database queries that, in turn, the knowledge manager utilizes during a question answer session.

FIG. 3 is an exemplary diagram depicting a knowledge manager that links natural language contexts to database queries that, in turn, the knowledge manager utilizes during a question answer session. Knowledge manager 100 ingests corpus of documents 320 from sources 310. Sources 310 may be, for example, books, journals, magazines, historical documents, electronic databases, etc. Domain generator 300 analyzes corpus of documents 320 to create, in one embodiment, structured resource 335 stored in domain store 330. In another embodiment, domain generator 300 ingests structured resource 335 as part of corpus of documents 320. Structured resource 335 may be, for example, a spreadsheet such as one similar to that shown in FIG. 4.

Synthetic event and database generator 340 identifies entity-cluster centroids that, in one embodiment, represents a spreadsheet row, an event, a time interval, an entity, etc., and generates a synthetic event (e.g., synthetic event A). Then, for each relationship between explicit member entities of the cluster, synthetic event and database generator 340 generates synthetic event relations that link the synthetic event to the entities, such as on a column-by-column basis (see FIG. 4 and corresponding text for further details). In turn, for each synthetic event, synthetic event and database generator 340 uses machine learning and pattern recognition algorithms on corpus of documents 320 in domain store 330 to identify a natural language context that links the members of the entities of each synthetic event relation (e.g., "A defeated C in E"). Synthetic event and database generator 340 stores each natural language context, along with a corresponding query, in one of pattern maps 355. Synthetic event and database generator 340 generates database 360 from structured resource 335 (e.g., tuples database) and stores database 360 and pattern maps 355 in database store 350.

When question answer system 370 receives question 385 from a user via graphical user interface (GUI) 380, question answer system 370 analyzes question 385 via natural language processing techniques and matches one or more of the natural language contexts in pattern maps 355 to the question. When question answer system 370 identifies a match, question answer system 370 invokes the corresponding queries to locate potential answers to the question (see FIG. 9, 10, and corresponding text for further details). In turn, question answer system 370 scores the potential answers and provides the highest scoring answer 390 back to GUI 380.

In one embodiment, question answer system 370 scores the potential answers based upon the complexity or format of the corresponding queries that generated the answers. For example, question answer system 370 may score an answer corresponding to a query with three synthetic event relations higher than a query with two synthetic event relations because the query with three synthetic event relations may provide a more precise answer. In another embodiment, question answer system 370 may apply weights to particular synthetic event relations that rarely result in a match and, in turn, rate their corresponding queries higher than other queries, even those with more overall synthetic event relations (see FIG. 10 and corresponding text for further details).

Figure 4:
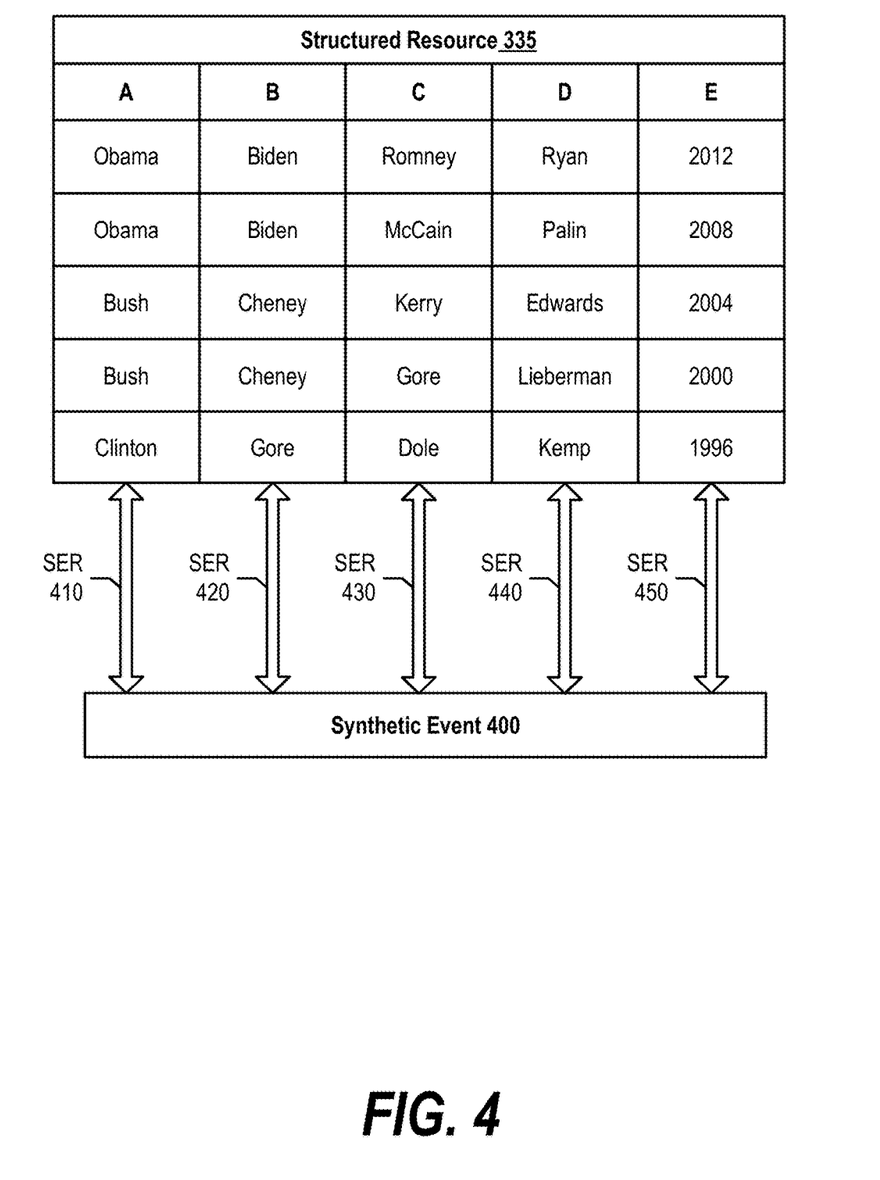
FIG. 4 is an exemplary diagram depicting a synthetic event and synthetic event relations (SERs) linked to entities of a structured resource.

FIG. 4 is an exemplary diagram depicting a synthetic event and synthetic event relations (SERs) linked to entities of a structured resource. Structured resource 335 includes five columns that each correspond to a particular relation. Synthetic event and database generator 340 creates synthetic event 400 as an entity-cluster centroid and then creates synthetic event relations (SERs) 410, 420, 430, 440, and 450 to link the entities of the last column in structured resource 335. In one embodiment, synthetic event and database generator 340 creates a synthetic event and corresponding SER's for each row in structured resource 335. In this embodiment, synthetic event and database generator 340 generates five synthetic events to coincide with the five rows shown in structured resource 335.

Figure 5:
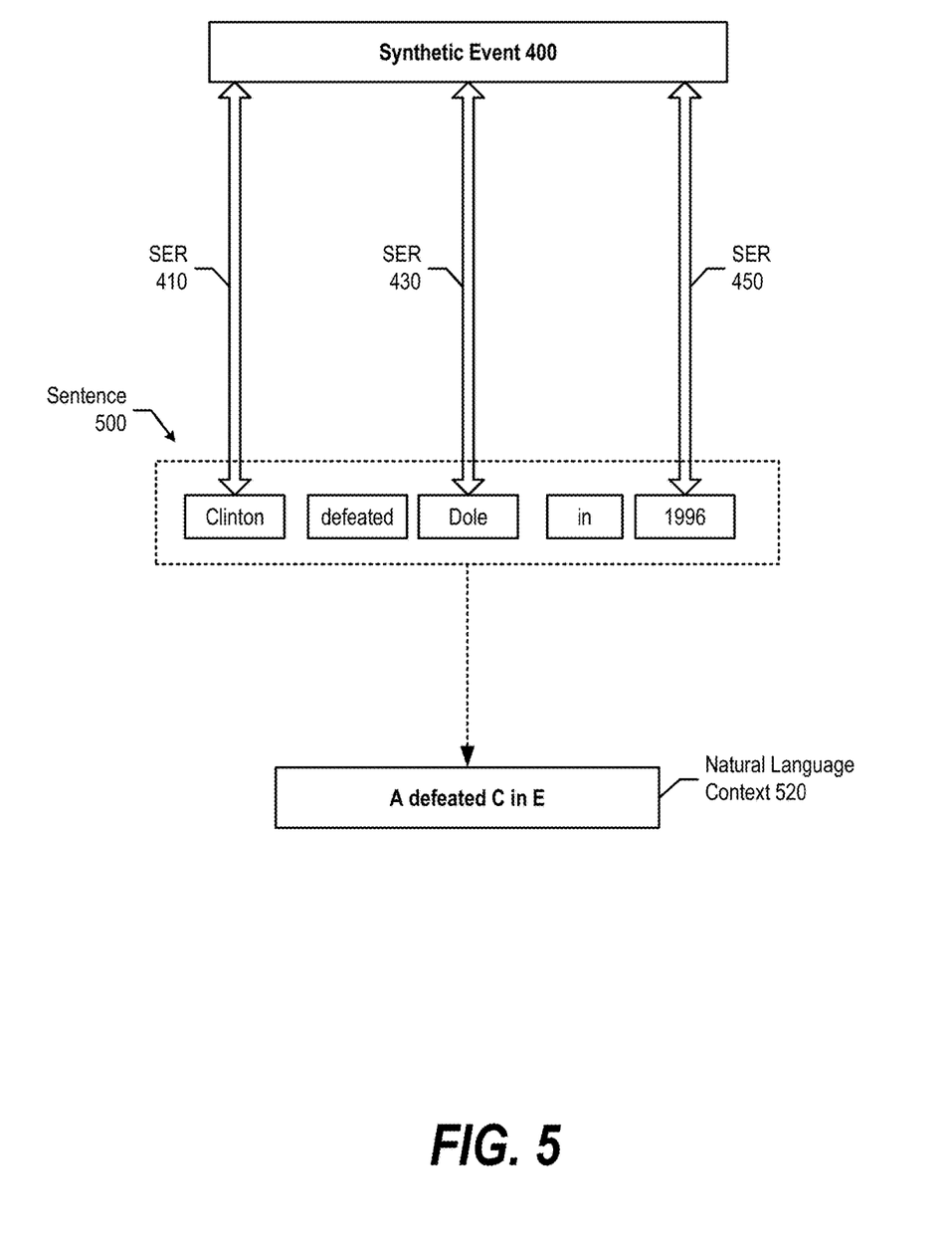
FIG. 5 is an exemplary diagram depicting a sentence from a corpus of documents mapped to a synthetic event and synthetic event relations, which allows a synthetic event and database generator to construct a corresponding natural language context.

In order to determine the relationship between the structured resource 335's columns, synthetic event and database generator 340 applies machine learning and pattern recognition algorithms to corpus of documents 320 stored in domain store 330 (see FIG. 5 and corresponding text for further details).

FIG. 5 is an exemplary diagram depicting a sentence from a corpus of documents mapped to a synthetic event and synthetic event relations, which allows a synthetic event and database generator to construct a corresponding natural language context. Synthetic event and database generator 340 analyze sentence 500 that is included in corpus of documents 320. Because this sentence contains a subset of the members of synthetic event 400, the sentence is assumed to convey some relevant information related to the information conveyed in the structured resource. Synthetic event and database generator 340 associates sentence 500 to synthetic event 400 and SERs 410, 430, and 450. The analysis can be of a surface-form nature, syntactic nature, or any other type. An example of a surface-form analysis would be "A defeated C in E". An example of a syntactic analysis would be "A is subject of 'defeat', C is the object of 'defeat', 'in' is the prepositional modifier of 'defeat', and E is the object of 'in'.

Based upon the context and sentence structure of sentence 500, synthetic event and database generator 340 generates natural language context 520, indicating that the entity in column A (Clinton) defeated the entity in column C (Dole) in the entity in column E (1996). In one embodiment, synthetic event 400 may correspond to multiple natural language contexts based upon the analysis phase of domain 330 (see FIG. 6 and corresponding text for further details).

Figure 6:
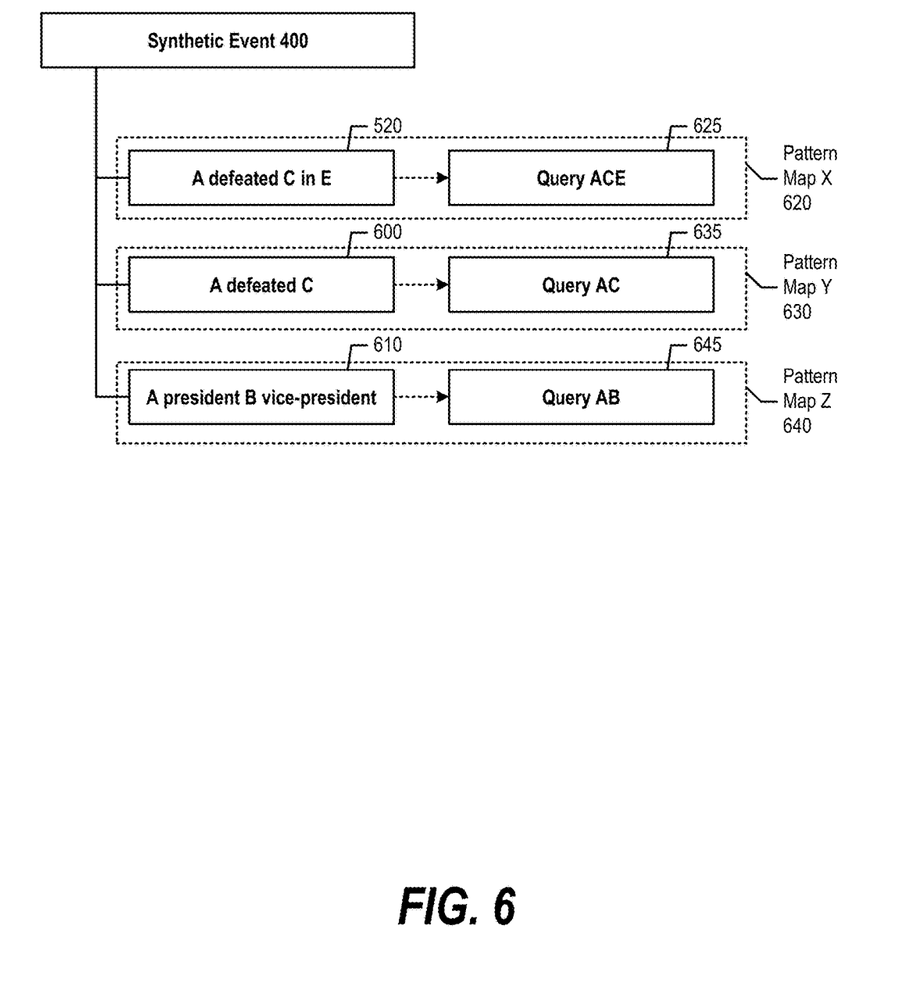
FIG. 6 is an exemplary diagram depicting multiple natural language contexts and queries associated with a synthetic event.

In addition, synthetic event and database generator 340 generates natural language contexts that identify relationships between the column entities at various levels (see FIG. 5 and corresponding text for further details). Once synthetic event and database generator 340 analyzes domain store 330, synthetic event and database generator 340 implicitly determines the following:

Column A: Winning Presidential Candidate
Column B: Winning Vice President Candidate
Column C: Losing Presidential Candidate
Column D: Losing Vice President Candidate
Column E: Election Year FIG. 6 is an exemplary diagram depicting multiple natural language contexts and queries associated with a synthetic event. The example shown in FIG. 6 shows that synthetic event and database generator 340 generated three natural language contexts (520, 600, and 610) for synthetic event 400 after analyzing corpus of documents 320. In turn, synthetic event and database generator 340 generates three pattern maps 620, 630, 640 and corresponding queries 625, 635, and 645, which are mapped to the individual natural language contexts. As such, when question answer system 350 matches an incoming question to one or more of the natural language contexts, the corresponding query invokes and provides potential answers back to question answer system 350 (see FIG. 7 and corresponding text for further details).

Figure 7:
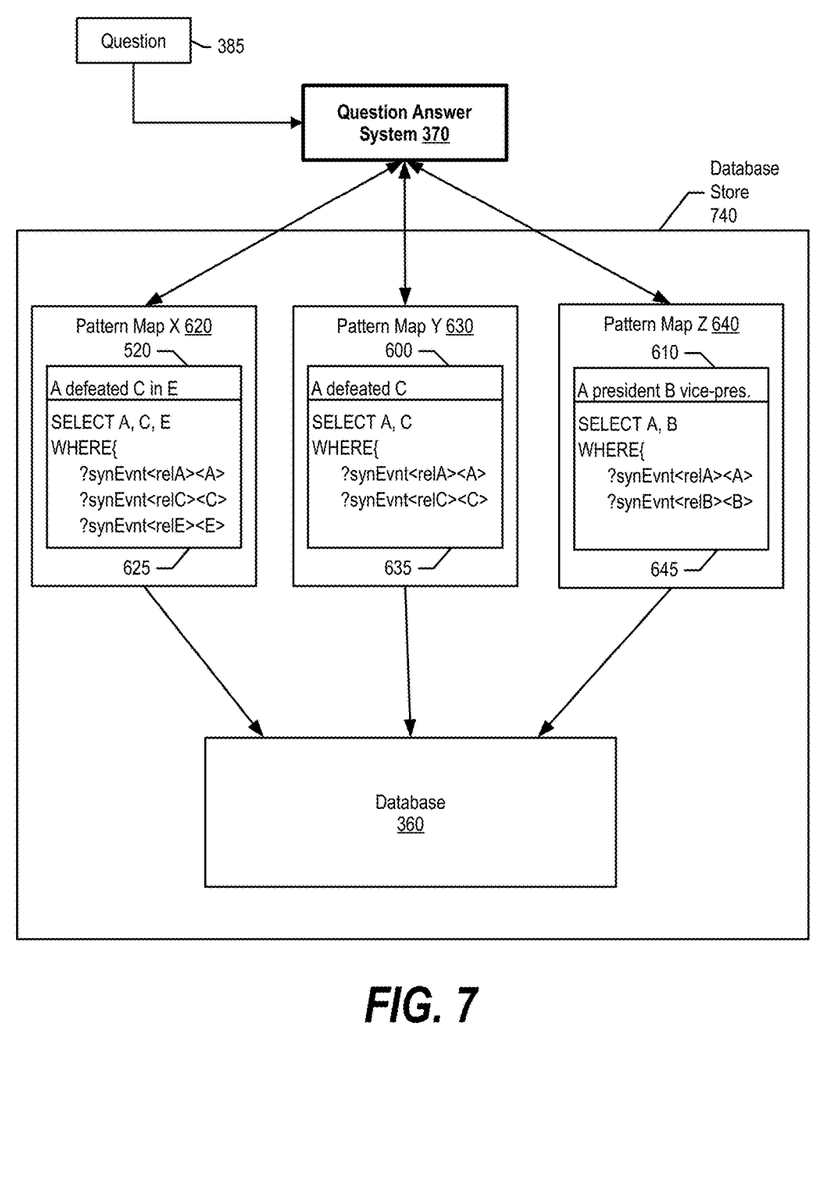
FIG. 7 is an exemplary diagram depicting a question answer system that matches natural language contexts to an incoming question and invokes a corresponding query that returns potential answers.

FIG. 7 is an exemplary diagram depicting a question answer system that matches natural language contexts to an incoming question and invokes a corresponding query that returns potential answers.

Question answer system 370 receives question 385 and analyzes the natural language contexts included pattern maps 620, 630, and 640. For example, if question 370 is "Who did Obama defeat in 2012?," question answer system 370 matches the question to natural language context 520 (A defeated C in E). Question answer system 370 may also match the question to natural language context 600 (A defeated C), which is a more general form of natural language context 520. When question answer system 370 locates a match, question answer system 370 invokes the corresponding query to perform a structured lookup in database 360. Using the example above, queries 625 and 635 perform structured lookups of database 360 to return potential answers to question answer system 370.

Figure 10:
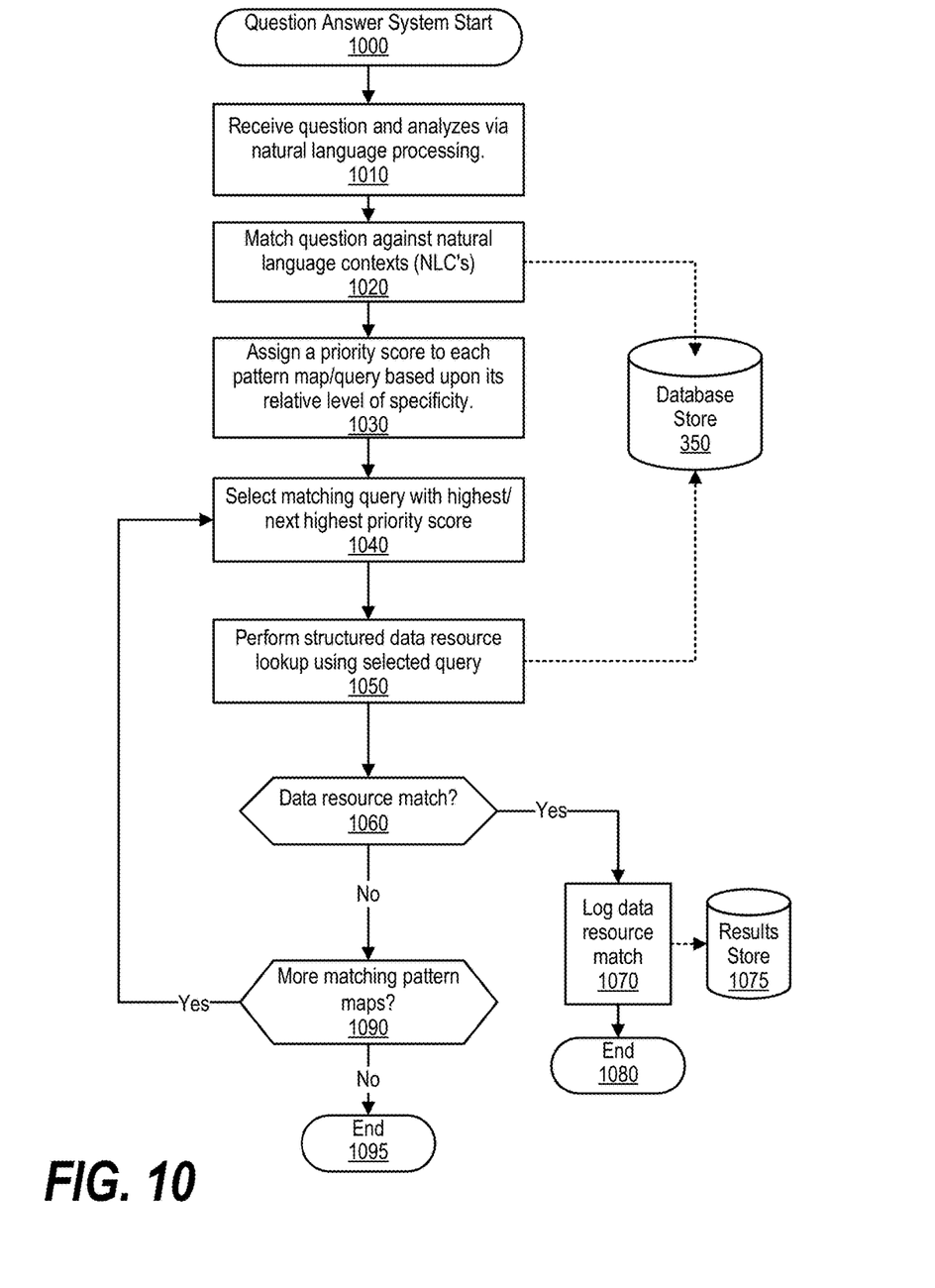
FIG. 10 is an exemplary flowchart depicting steps taken by a knowledge manager to utilize analytics to score query results based upon the uniqueness of the corresponding pattern maps.

In one embodiment, question answer system 370 assigns priority scores to pattern maps, queries, or query results based upon factors such as the number of synthetic event relations corresponding to a pattern map, uniqueness of particular synthetic event relations, etc., and use the highest scoring queries to perform the structured lookups (see FIG. 10 and corresponding text for further details).

Figure 8:
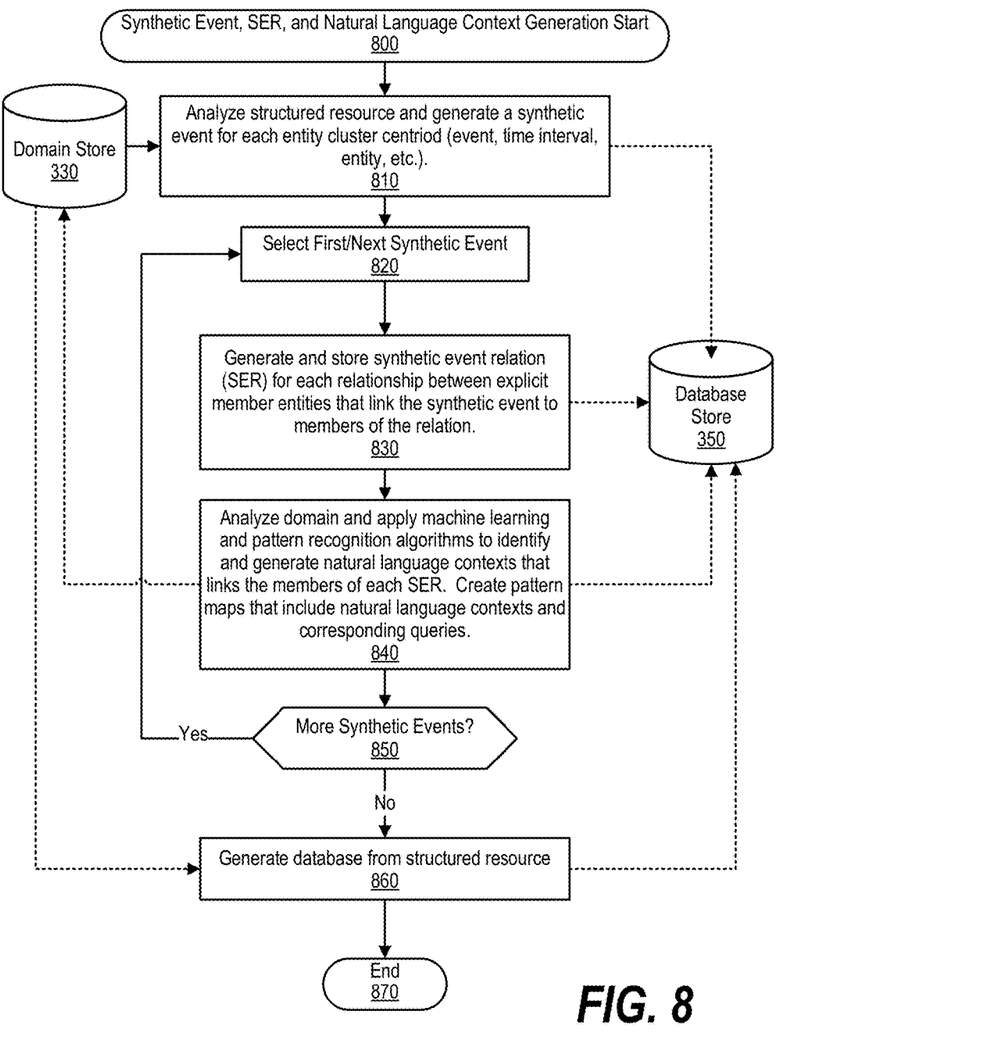
FIG. 8 is an exemplary flowchart depicting steps taken by a knowledge manager to generate synthetic events, synthetic event relations, natural language contexts, pattern maps, and a database for subsequent database queries.

FIG. 8 is an exemplary flowchart depicting steps taken by a knowledge manager to generate synthetic events, synthetic event relations, natural language contexts, pattern maps, and a database for subsequent database queries. Processing commences at 800, whereupon the process analyzes a structured resource (e.g., structured resource 335) and generates a synthetic event for each entity-cluster centroid (event, time interval, entity, etc.).

At step 820, the process selects the first synthetic event and, at step 830, the process generates and stores a synthetic event relation (SER) for each relationship between explicit member entities that link the synthetic event to members of the relation (see FIG. 4 and corresponding text for further details). Next, at step 840, the process applies machine learning and pattern recognition algorithms to corpus of documents 320 in domain store 330 to identify natural language contexts corresponding to the structure resource that link the entities of each synthetic event relation (see FIG. 5 and corresponding text for further details). The process creates pattern maps that each include a natural language context and a corresponding query, which the process stores in database store 350 (see FIG. 6 and corresponding text for further details).

The process determines as to whether there are more synthetic events to evaluate (decision 850). If there are more synthetic events, then decision 850 branches to the 'yes' branch, which loops back to select and process the next synthetic event. This looping continues until there are no more synthetic events to evaluate, at which point decision 850 branches to the 'no' branch. At step 860, the process generates a database (e.g., tuples) for subsequent queries from the structured resource and stores the database in database store 350. FIG. 8 processing thereafter ends at 870.

Figure 9:
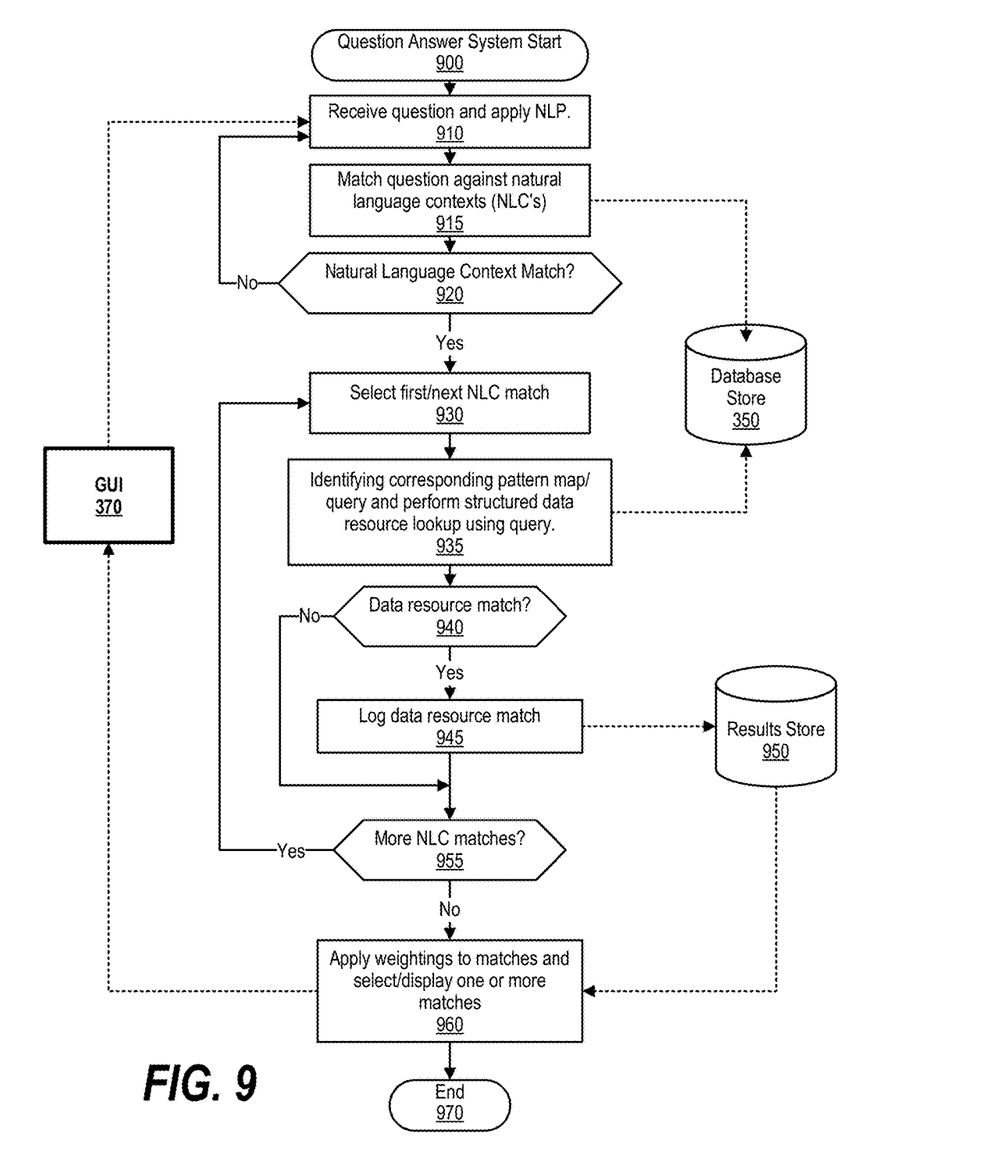
FIG. 9 is an exemplary flowchart depicting steps taken to match a question to a natural language context, and use a corresponding pattern map to query a database for an answer to the question.

FIG. 9 is an exemplary flowchart depicting steps taken to match a question to a natural language context, and use a corresponding pattern map to query a database for an answer to the question. Processing commences at 900, whereupon the process receives a question and applies natural language processing to the question at step 910. At step 915, the process matches the question against natural language contexts included in database store 350.

The process determines as to whether natural language contexts match (decision 920). If the process does not match any natural language contexts, then decision 920 branches to the "No" branch, which loops back to receive another question. In one embodiment, the process may provide a response to GUI 370 indicating that an answer was not returned.

On the other hand, if the process identifies one or more natural language context matches, decision 920 branches to the "Yes" branch. At step 930, the process selects the first natural language context match and at step 935, the process identifies a corresponding pattern map and performs a structured data resource lookup using the query in the pattern map.

The process determines as to whether the lookup results in a data resource match (decision 940). If the lookup results in a data resource match, then decision 940 branches to the 'yes' branch. At step 945, the process logs the data resource match in results store 950. On the other hand, if the lookup did not result in a data resource match, then decision 940 branches to the 'no' branch.

The process determines as to whether there are more natural language contexts that match the question (decision 955). If there are more natural language context matches, then decision 955 branches to the 'yes' branch, which loops back to select and process the next natural language context match. This looping continues until there are no more natural language context matches, at which point decision 955 branches to the 'no' branch.

At step 960, in one embodiment, the process applies weightings to the data resource matches and selects the highest weighted data resource match to provide to GUI 370. For example, the process may apply weightings based upon the level of detail of the lookup results (e.g., how many entities a query returned). In another embodiment, the process uses an analytical approach to apply weightings based upon synthetic event relations complexities of the various matching pattern maps (see FIG. 10 and corresponding text for further details). FIG. 9 processing thereafter ends at 970.

FIG. 10 is an exemplary flowchart depicting steps taken by a knowledge manager to utilize analytics to score query results based upon the uniqueness of the corresponding pattern maps.

Processing commences at 1000, whereupon the process receives a question and applies natural language processing at step 1010. At step 1020, the process matches the question against natural language contexts (NLC's) included in database store 350. The process assigns a priority score to each corresponding pattern map/query that includes a matching natural language context based upon its relative level of specificity at step 1030. For example, if a query includes a unique synthetic event relation that may not receive many hits, such as one that corresponds to a street name, the process may assign a higher weighting to the query. In one embodiment, the process performs a search using each of the matching pattern maps/queries, and then assigns the corresponding priority scores to the query results.

At step 1040, the process selects the pattern map/query with the highest priority score and, at step 1050, the process performs a structured data resource lookup using the selected query. The process determines as to whether the query resulted in a data resource match (decision 1060). If the query resulted in a data resource match, then decision 1060 branches to the 'yes' branch. At step 1070, the process logs the data resource match and FIG. 10 processing thereafter ends at 1080.

On the other hand, if the highest priority scoring pattern match does not result in a data resource match, then decision 1060 branches to the 'no' branch. The process determines as to whether there are more matching pattern maps (decision 1090). If there are more matching pattern maps, then decision 1090 branches to the 'yes' branch, which loops back to select and process the next highest matching pattern map. This looping continues until there are no more matching pattern maps, at which point decision 1090 branches to the "No" branch. FIG. 10 processing thereafter ends at 1095.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:
    determining a plurality of relations between a plurality of entities in a structured resource by matching the plurality of entities to one or more sentences in a corpus of documents; and
    in response to the determining of the plurality of relations:
        creating a database from the plurality of entities based upon the determined plurality of relations;
        creating a plurality of natural language contexts that each link a subset of the plurality of entities based on the determined plurality of relations;
        matching the plurality of natural language contexts to a question received by the information handling system;
        assigning one of a plurality of priority scores to each of a plurality of database queries corresponding to the matched plurality of natural language contexts, wherein each of the plurality of priority scores are based upon a level of specificity of at least one of the plurality of relations indicated in their corresponding database query;
        invoking a selected one of the plurality of database queries on the database based upon the priority score of the selected database query;
        determining that the selected database query does not return a valid result;
        selecting a different one of the plurality of database queries based upon the priority score of the different database query; and
        invoking the different database query to perform a structured lookup on the database.

2. The method of claim of claim 1 wherein the database comprises a plurality of tuples corresponding to the plurality of relations.

3. The method of claim 1 further comprising:
    determining that the structured resource comprises a plurality of entity-cluster centroids;
    generating a synthetic event for each one of the plurality of entity-cluster centroids, resulting in a plurality of synthetic events;
    selecting one of the plurality of synthetic events; and
    linking a plurality of synthetic event relations to the selected synthetic event, wherein the plurality of synthetic event relations correspond to the plurality of relations.

4. An information handling system comprising: one or more processors;
    a memory coupled to at least one of the processors; and
    a set of computer program instructions stored in the memory and executed by at least one of the processors in order to perform actions of:
        determining a plurality of relations between a plurality of entities in a structured resource by matching the plurality of entities to one or more sentences in a corpus of documents; and
        in response to the determining of the plurality of relations:
            creating a database from the plurality of entities based upon the determined plurality of relations;
            creating a plurality of natural language contexts that each link a subset of the plurality of entities based on the determined plurality of relations;
            matching the plurality of natural language contexts to a question received by the information handling system;
            assigning one of a plurality of priority scores to each of a plurality of database queries corresponding to the matched plurality of natural language contexts, wherein each of the plurality of priority scores are based upon a level of specificity of at least one of the plurality of relations indicated in their corresponding database query;
            invoking a selected one of the plurality of database queries on the database based upon the priority score of the selected database query;
            determining that the selected database query does not return a valid result;
            selecting a different one of the plurality of database queries based upon the priority score of the different database query; and
            invoking the different database query to perform a structure lookup on the database.

5. The information handling system of claim of claim 4 wherein the database comprises a plurality of tuples corresponding to the plurality of relations.

6. The information handling system of claim 4 wherein the one or more processors perform additional actions comprising:
    determining that the structured resource comprises a plurality of entity-cluster centroids;
    generating a synthetic event for each one of the plurality of entity-cluster centroids, resulting in a plurality of synthetic events;
    selecting one of the plurality of synthetic events; and
    linking a plurality of synthetic event relations to the selected synthetic event, wherein the plurality of synthetic event relations correspond to the plurality of relations.

7. A computer program product stored in a computer readable storage medium, comprising computer program code that, when executed by an information handling system, causes the information handling system to perform actions comprising:
    determining a plurality of relations between a plurality of entities in a structured resource by matching the plurality of entities to one or more sentences in a corpus of documents; and
    in response to the determining of the plurality of relations:
        creating a database from the plurality of entities based upon the determined plurality of relations;
        creating a plurality of natural language contexts that each link a subset of the plurality of entities based on the determined plurality of relations;
        matching the plurality of natural language contexts to a question received by the information handling system;
        assigning one of a plurality of priority scores to each of a plurality of database queries corresponding to the matched plurality of natural language contexts, wherein each of the plurality of priority scores are based upon a level of specificity of at least one of the plurality of relations indicated in their corresponding database query;

invoking a selected one of the plurality of database queries on the database based upon the priority score of the selected database query;

determining that the selected database query does not return a valid result;

selecting a different one of the plurality of database queries based upon the priority score of the different database query; and invoking the different database query to perform a structure lookup on the database.

8. The computer program product of claim 7 wherein the information handling system performs additional actions comprising:

determining that the selected database query does not return a valid result;

selecting a different one of the plurality of database queries based upon the priority score of the different database query; and invoking the different database query to perform a structured lookup on the database.

9. The computer program product of claim 7 wherein the information handling system performs additional actions comprising:

determining that the structured resource comprises a plurality of entity-cluster centroids;

generating a synthetic event for each one of the plurality of entity-cluster centroids, resulting in a plurality of synthetic events;

selecting one of the plurality of synthetic events; and linking a plurality of synthetic event relations to the selected synthetic event, wherein the plurality of synthetic event relations correspond to the plurality of relations.

* * * * *